United States Patent
Nuzman

(10) Patent No.: US 9,094,097 B2
(45) Date of Patent: Jul. 28, 2015

(54) METHODS AND SYSTEMS FOR REDUCING CROSSTALK

(71) Applicant: Alcatel-Lucent USA Inc., Murray Hill, NJ (US)

(72) Inventor: Carl J. Nuzman, Union, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/749,097

(22) Filed: Jan. 24, 2013

(65) Prior Publication Data
US 2014/0205082 A1    Jul. 24, 2014

(51) Int. Cl.
*H04M 1/76* (2006.01)
*H04B 3/32* (2006.01)

(52) U.S. Cl.
CPC ........................................ *H04B 3/32* (2013.01)

(58) Field of Classification Search
CPC ............. G09G 2320/0209; H04B 3/32; H04B 10/071; H04B 10/079; H04B 3/30; H04B 3/20; H04B 3/23; H04B 1/7117; H04B 1/7115; H04M 11/062; H04M 3/304; H04M 3/34; H04M 9/082; H04M 3/30; H04L 27/2647; H04L 25/03057
USPC ................. 379/406.01–406.16, 417, 28, 416; 370/201; 375/144, 148, 346, 348
See application file for complete search history.

(56) References Cited

U.S. PATENT DOCUMENTS

| | | | |
|---|---|---|---|
| 7,852,951 B2* | 12/2010 | Kalluri et al. | 375/260 |
| 2010/0303136 A1* | 12/2010 | Ashikhmin et al. | 375/222 |
| 2012/0106315 A1* | 5/2012 | Chow | 370/201 |
| 2012/0195183 A1* | 8/2012 | Nuzman et al. | 370/201 |
| 2013/0259210 A1* | 10/2013 | Cornil et al. | 379/22.02 |

OTHER PUBLICATIONS

"Self-FEXT Cancellation (Vectoring) for Use With VDSL2 Transceivers," Series G: Transmission Systems and Media, Digital Systems and Networks, ITU G.993.5, Apr. 2010.
Oksam, et al., "G.fast: Precoder update in support of discontinuous operation," ITU Telecommunication Standardization Sector, Jan. 22, 2013.

* cited by examiner

*Primary Examiner* — Akelaw Teshale
(74) *Attorney, Agent, or Firm* — Harness, Dickey & Pierce, P.L.C.

(57) ABSTRACT

At least one example embodiment discloses a method of reducing crosstalk interference in a system having a plurality of communication paths. The method includes obtaining a plurality of signal values corresponding to a set of active communication paths, the active communication paths being a subset of the plurality of communication paths, obtaining an inverse channel matrix, the inverse channel matrix representing an inverse crosstalk channel matrix of the system when the plurality of communication paths in the system are active, determining a plurality of sub-matrices from the inverse channel matrix based on the set of active communication paths and compensating the signal values for crosstalk by individually applying at least one of the sub-matrices to the plurality of signal values.

19 Claims, 9 Drawing Sheets

METHODS AND SYSTEMS FOR REDUCING CROSSTALK

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two VDSL2 lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Each communication line is a possible disturber line which induces crosstalk in one or more victim lines. Moreover, in today's systems, the number of active communication lines may vary. Thus, the induced crosstalk varies as the number of active communication lines vary.

By transmitting test signals across all the lines, it is possible to determine the influence of each disturber line on the victim lines. The test signals can be characterized by the way in which power is allocated to one or more tones or frequencies. For instance, a test signal may be transmitted using a particular power level over a small frequency range. The victim line may notice this power in that frequency range and be able to determine the amplitude of that power. The amplitude of the induced influence of crosstalk on a particular line is a good reference to determine how strong particular crosstalk disturbers are into that victim or which frequencies or tones are susceptible to the crosstalk of certain crosstalk disturbers into that victim.

Precoding (also referred to as precompensation) techniques are based on transmitting an additional signal added to the data signal which is used to compensate the crosstalk on a victim line from external sources. Thus, instead of reducing the effect of crosstalk or avoiding crosstalk effects by configuring the communication line in an appropriate way, precoding can be used to compensate for the effects of crosstalk on a communication channel. Precoding techniques are based on crosstalk channel information that includes both amplitude and phase information. Such information can be obtained by processing measurements such as slicer error or signal-to-noise ratio (SNR). A particular example of such measurements for precoding is the use of pilot sequences and error feedback. The use of pilot sequences in G.vector is described in "Self-FEXT cancellation (vectoring) for use with VDSL2 transceivers," *Series G: Transmission Systems and Media, Digital Systems and Networks, ITU G.993.5,* April 2010, the entire contents of which is incorporated by reference.

SUMMARY

Example embodiments are directed to methods and systems for reducing crosstalk.

In a dynamic system where a number of active communication lines varies, a precoding matrix to apply is generally obtained through tracking and estimation, which takes time. Example embodiments enable crosstalk cancellation in a dynamic system while improving the time consumed to determine a precoding matrix.

At least one example embodiment discloses a method of reducing crosstalk interference in a system having a plurality of communication paths. The method includes obtaining a plurality of signal values corresponding to a set of active communication paths, the active communication paths being a subset of the plurality of communication paths, obtaining an inverse channel matrix, the inverse channel matrix representing an inverse crosstalk channel matrix of the system when the plurality of communication paths in the system are active, determining a plurality of sub-matrices from the inverse channel matrix based on the set of active communication paths and compensating the signal values for crosstalk by individually applying at least one of the sub-matrices to the plurality of signal values.

In an example embodiment, the compensating includes directly applying first and second sub-matrices to the plurality of signal values.

In an example embodiment, the compensating includes multiplying the first sub-matrix with the plurality of signal values and multiplying the second sub-matrix with the plurality of signal values.

In an example embodiment, the compensating includes directly compensating the plurality of signal values based on a difference between a product of multiplying the second sub-matrix with the plurality of signal values and a first value, the first value being based on a product of multiplying the first sub-matrix with the plurality of signal values.

In an example embodiment, the sub-matrices correspond to all combinations of the set of active communication paths and inactive communication paths including active to active communication paths, active to inactive communication paths, inactive to active communication paths, and inactive to inactive communication paths.

In an example embodiment, the compensating compensates the signal values as $$[(I+C_{SS})-C_{SQ}(I-C_{QQ})C_{QS}]X_S$$

wherein $C_{SS}$, $C_{SQ}$, $C_{QQ}$ and $C_{QS}$ are sub-matrices from the inverse channel matrix, I is an identity matrix and $X_S$ is the plurality of signal values.

In an example embodiment, the compensating compensates the signal values as $$[(I+C_{SS})-C_{SQ}D_{QQ}^{-1}(I-B_{QQ}D_{QQ}^{-1})C_{QS}]X_S$$

wherein $C_{SS}$, $C_{SQ}$, $C_{QQ}$, and $C_{QS}$ are sub-matrices from the inverse channel matrix, $D_{QQ}$ is the diagonal component of $C_{QQ}$, $B_{QQ}$ is the off-diagonal component of $C_{QQ}$, I is an identity matrix and $X_S$ is the plurality of signal values.

In an example embodiment, the method further includes transmitting, during a training phase, a plurality of pilot signals on all communication paths and determining the inverse channel matrix based on the transmitting.

In an example embodiment, the method further includes activating, during a data transmission phase, only the active communication paths.

At least one example embodiment discloses a system having a plurality of communication paths. The system includes a controller configured to obtain a plurality of signal values corresponding to a set of active communication paths, the active communication paths being a subset of the plurality of communication paths, obtain an inverse channel matrix, the inverse channel matrix representing an inverse crosstalk channel matrix of the system when the plurality of communication paths in the system are active, determine a plurality of sub-matrices from the inverse channel matrix based on the set of active communication paths, and compensate the signal values for crosstalk by individually applying at least one of the sub-matrices to the plurality of signal values.

In an example embodiment, the controller is further configured to directly apply first and second sub-matrices to the plurality of signal values.

In an example embodiment, the controller is further configured to multiply the first sub-matrix with the plurality of signal values, and multiply the second sub-matrix with the plurality of signal values.

In an example embodiment, the controller is further configured to directly compensate the plurality of signal values based on a difference between a product of multiplying the second sub-matrix with the plurality of signal values and a first value, the first value being based on a product of multiplying the first sub-matrix with the plurality of signal values.

In an example embodiment, the sub-matrices correspond to all combinations of the set of active communication paths and inactive communication paths.

In an example embodiment, the controller is further configured to compensate the signal values as $$[(I+C_{SS})-C_{SQ}(I-C_{QQ})C_{QS}]X_S$$

wherein $C_{SS}$, $C_{SQ}$, $C_{QQ}$ and $C_{QS}$ are sub-matrices, I is the identity matrix and $X_S$ is the plurality of signal values.

In an example embodiment, the controller is further configured to compensate the signal values as $$[(I+C_{SS})-C_{SQ}D_{QQ}^{-1}(I-B_{QQ}D_{QQ}^{-1})C_{QS}]X_S$$

wherein $C_{SS}$, $C_{SQ}$, $C_{QQ}$, and $C_{QS}$ are sub-matrices from the inverse channel matrix, $D_{QQ}$ is the diagonal component of $C_{QQ}$, $B_{QQ}$ is the off-diagonal component of $C_{QQ}$, I is an identity matrix and $X_S$ is the plurality of signal values.

In an example embodiment, the controller is further configured to transmit during a training phase, a plurality of pilot signals on all communication paths and determine the inverse crosstalk channel matrix based on the transmitting.

In an example embodiment, the controller is further configured to activate during a data transmission phase, only the active communication paths.

BRIEF DESCRIPTION OF THE DRAWINGS

Example embodiments will be more clearly understood from the following detailed description taken in conjunction with the accompanying drawings. FIGS. 1-8 represent non-limiting, example embodiments as described herein.

FIG. 1 illustrates a conventional DSL system;

FIG. 2 illustrates a system for vectoring (crosstalk cancellation);

FIGS. 3-5 illustrate conventional precoders;

FIG. 7 illustrates a controller including a controller of FIG. 2 including a precoder according to an example embodiment; and FIG. 8 illustrates a method of reducing crosstalk interference according to an example embodiment.

DETAILED DESCRIPTION

Figure 1:
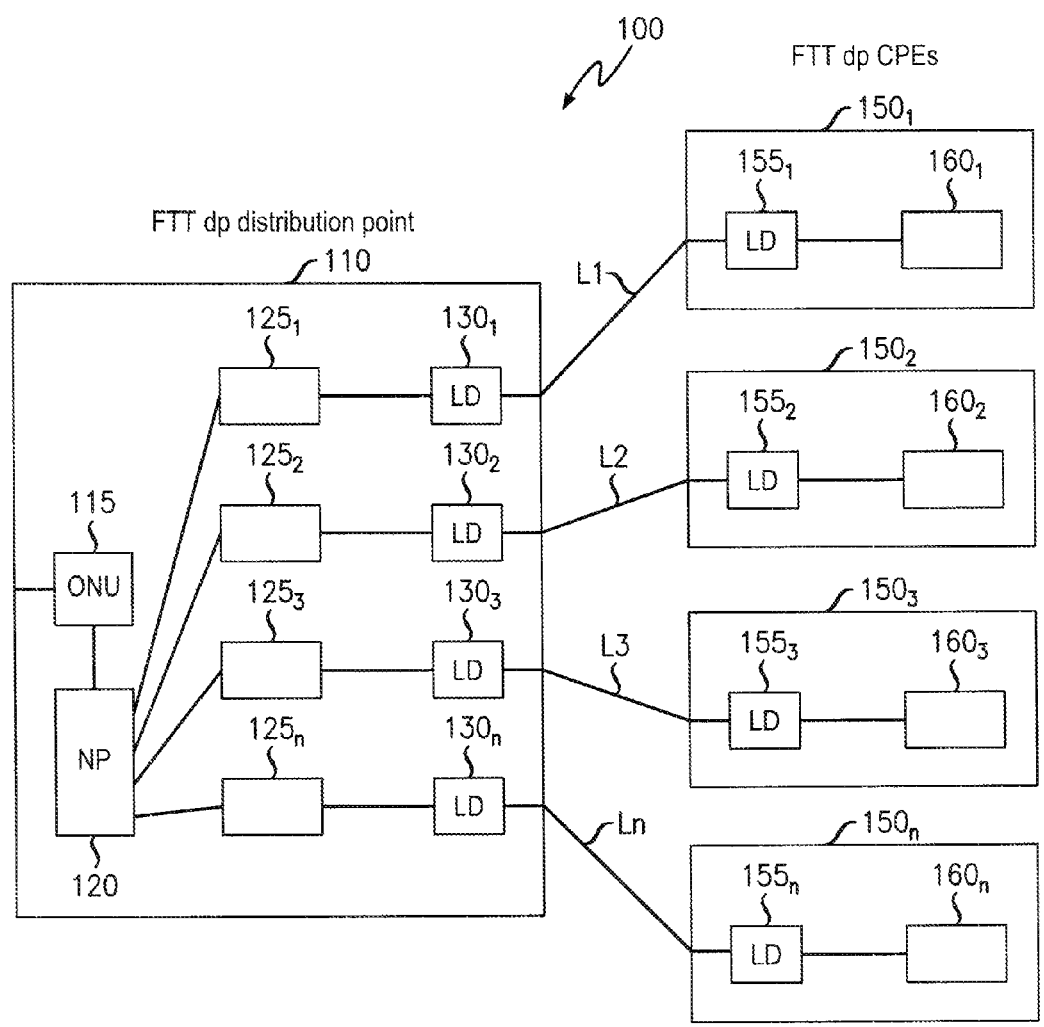

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors or controllers.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

In the context of providing data network access to homes and businesses, various technologies collectively known as FTTx have been used or proposed. In these technologies, data is conveyed from a network operator to an intermediate location using fiber optics, and data is conveyed from the intermediate location to the customer location using DSL transmission over twisted pair copper lines. The term FTTdp refers to a scenario in which the intermediate location is a "distribution point", serving up to a few dozen customers within a distance of less than 200 m. The International Telecommunications Union (ITU) has created a working group to develop a recommendation, currently referred to as G.fast, whose purpose is to create a standards-based technology for FTTdp. Example embodiments may be implemented over the twisted pair section of an FTTdp network, but are not limited thereto.

FIG. 1 illustrates a conventional DSL system. As shown, a system 100 includes a distribution point 110 and Customer Premises Equipment (CPEs) $150_1$-$150_n$. The distribution point 110 and the CPEs $150_1$-$150_n$ may be configured to implement FTTdp. In some example embodiments, the distribution point 110 may be a DSLAM (digital subscriber line access multiplexer). In other example embodiments, the distribution point 110 may include an individual optical network unit (ONU) associated with each user, and four optical fibers connected. The multiplexing of the four users into a single line would occur in the fiber optics part of the network. Each of the CPEs $150_1$-$150_n$ may be in a separate home or office with its own CPE, for example. Moreover, each of the CPEs $150_1$-$150_n$ may transmit and receive data, and therefore, may be referred to as transceivers.

The system 100 may be a DSL system, VDSL system, VDSL2 system, or a G.fast system for example.

The distribution point 110 may be under control of an operator. The distribution point 110 includes an ONU 115 configured to communicate with a network processor (NP) 120. As is known, the ONU 115 provides a high-bandwidth data connection over a fiber optic channel to an optical line terminal (OLT) located in a central office. The ONU passes received downstream data frames or packets to the NP 120, which then determines the destination for the frames or packets and accordingly forwards them to an appropriate DSL interface. Similarly, in the upstream direction, the NP 120 forwards frames or packets from the DSL interfaces to the ONU 115.

The NP 120 provides signals to processing devices $125_1$-$125_n$. Each of the processing devices $125_1$-$125_n$ provides a DSL interface. While the number of processing devices $125_1$-$125_n$ shown is four, the number of processing devices $125_1$-$125_n$ may be greater than or less than four. The processing devices $125_1$-$125_n$ may be physical layer single-input-single-output (SISO) processing devices.

Each of the processing devices $125_1$-$125_n$ may communicate with one of the CPEs $150_1$-$150_n$ over communication lines L1-Ln through an associated line driver (LD) $130_1$-$130_n$. The communication lines L1-Ln may be twisted line pairs that carry electromagnetic signals. As should be understood, the communications are not limited to twisted line pairs. The system 100 may communicate using DSL signals, VDSL signals, and Ethernet signals, for example. Each pair of processing devices $125_1$-$125_n$ and associated LDs $130_1$-$130_n$ may transmit and receive data, and therefore, may be referred to as transceivers.

The processing devices $125_1$-$125_n$ modulate the data, generating a time-domain digital signal to the LDs $130_1$-$130_n$ consisting of a sampled sequence of values to transmit. The LDs $130_1$-$130_n$ then convert the digital signal to analog form, amplify it, and transmit the analog signal over the communication lines L1-Ln, respectively, to the CPEs $150_1$-$150_n$, respectively.

FIG. 1 shows a total of four communication lines connected to the distribution point 110. However, a distribution point may be connected to a larger number of lines than four. In addition, a precoding group may not be limited to the lines connected to a single distribution point. A precoding group may for instance contain several tens of lines which are distributed over a number of distribution points. In such case, coordination between distribution points may be required. FIG. 1 furthermore only shows the elements in the communication network which are relevant for the understanding of example embodiments. Therefore, elements such as network equipment to which the distribution point is connected, links connecting the distribution point to such equipment, intermediary devices, etc., are not shown in this figure.

While the number of CPEs $150_1$-$150_n$ shown is four, the number of processing devices CPEs $150_1$-$150_n$ may be greater than or less than four. Each of the CPEs $150_1$-$150_n$ includes an associated line driver $155_1$-$155_n$ and processing device $160_1$-$160_n$.

The processing devices $160_1$-$160_n$ may be the same or substantially the same as the processing devices $125_1$-$125_n$ and, therefore, will not be described in greater detail for the sake of brevity.

The communication lines L1-Ln may extend from the distribution point 110 to the CPEs $150_1$-$150_n$ respectively.

However, the system 100 may be subject to crosstalk if the lines L1-Ln are not sufficiently physically separated.

More specifically, any one of the lines L1-Ln may be considered a victim line and the remaining lines L1-Ln may be considered disturber lines. Each of the lines L1-Ln may be associated with a customer. For the sake of clarity and brevity, L1 will be described as the victim line.

Near end crosstalk (NEXT) is the coupling that occurs between a transmitted signal at one side of a disturber line, for example, the communication lines L2-Ln, and a signal at a transceiver (not shown) at the same end of the victim line L1. For example, coupling between signals transmitted from the LD $130_2$ into the receiver at the LD $130_1$ is near-end crosstalk.

Contrary to NEXT, far end crosstalk (FEXT) occurs, for example, when signals sent from the distribution point 110 into the disturber lines L2-Ln couple into victim line L1 and cause interference to the receiver at CPE $150_1$, or signals sent from the CPEs $150_2$-$150_n$ into the disturber lines L2-Ln couple into victim line L1 and cause interference to the receiver at LD $130_1$.

In the system 100, data rates could be impacted by crosstalk interference between the communication lines L1-Ln.

To avoid crosstalk interference, a scheduler may be added to the distribution point 110. The scheduler allows one subscriber to transmit at a time. An interface is defined between the processing devices $125_1$-$125_n$ and the scheduler. In this way, each user can achieve high peak rates without being affected by crosstalk.

However, when using scheduling, the communication lines L1-Ln become a shared medium, and the average data rates are inversely proportional to the number of active lines. With a scheduler, there is only one active line at a time.

To improve performance, vectoring can be used. Vectoring is also referred to crosstalk cancellation. Crosstalk cancellation improves data rates and allows simultaneous communication over multiple lines, instead of scheduling. Crosstalk cancellation in VDSL2 is described in ITU G.993.5, "Self-FEXT cancellation (vectoring) for use with VDSL2 transceivers," *Series G: Transmission Systems and Media, Digital Systems and Networks, ITU G.*993.5, April 2010, also known as the G.vector recommendation.

Figure 2:
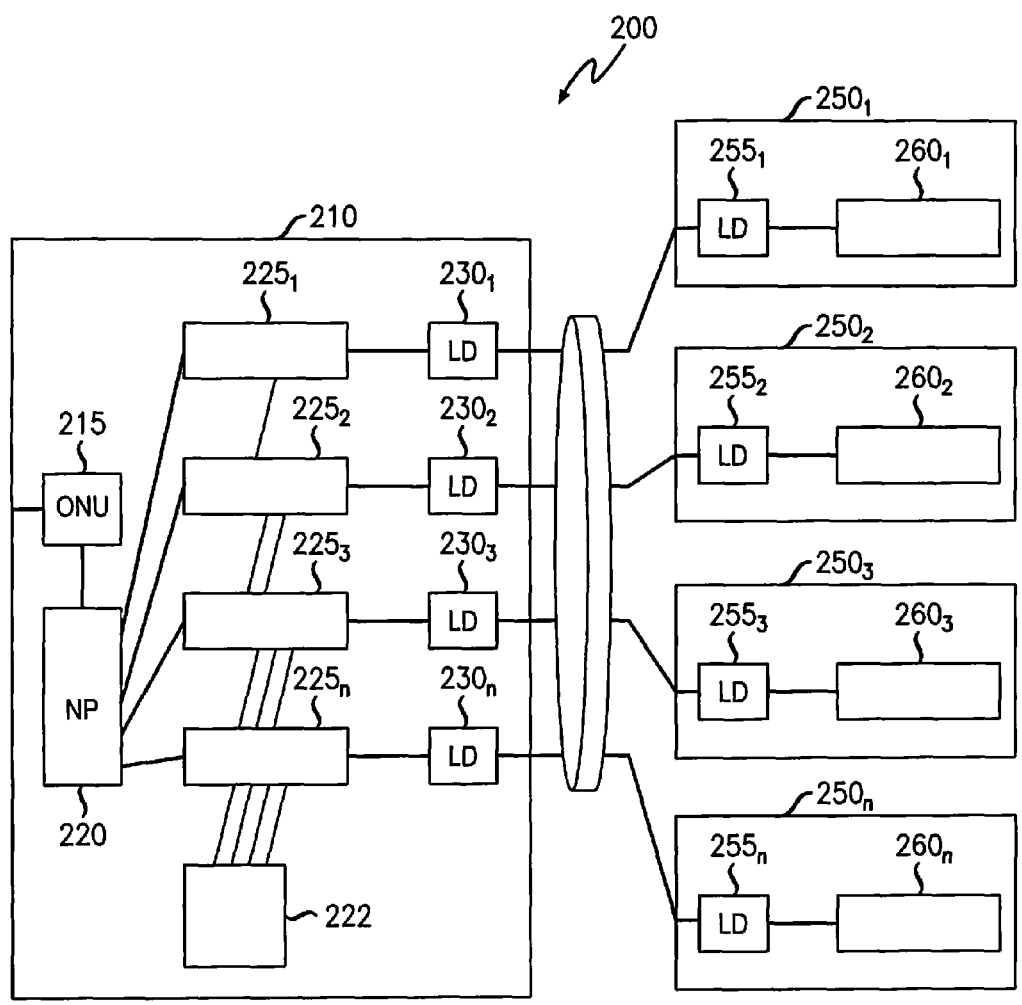

FIG. 2 illustrates a system for vectoring (crosstalk cancellation). As shown in FIG. 2, a system 200 includes a distribution point 210 and Customer Premises Equipment (CPEs) $250_1$-$250_n$.

In the system 200, the techniques defined in G.vector are extended to a new physical layer standard that uses a higher transmission bandwidth to get much higher rates. The distribution point 210 may be under control of an operator. The distribution point 210 includes an optical network unit (ONU) 215 configured to communicate with an NP 220. The ONU 215 and the NP 220 are the same as the ONU 115 and the NP 120, respectively, and therefore, will not be described in greater detail.

The NP 220 provides signals to processing devices $225_1$-$225_n$. While the number of processing devices $225_1$-$225_n$ shown is four, the number of processing devices $225_1$-$225_n$ may be greater than or less than four. The processing devices $225_1$-$225_n$ are adapted for point-to-point communication.

The distribution point 210 further includes a controller 222. The controller 222 may include a precoder according to example embodiments, as will be described in further detail below. The controller 222 is configured to receive signal data from the processing devices $225_1$-$225_n$. The signal data may include signal values intended to be received by corresponding processing devices $260_1$-$265_n$. The controller is also configured to send pre-compensated symbol data back to the processing devices $225_1$-$225_n$. Generally, the data exchanged between processing devices $225_1$-$225n$ would be frequency-domain samples, but alternatively the data could be represented as time-domain samples, for example.

The controller 222 communicates with the processing devices $225_1$-$225_n$. Alternatively, the controller 222 may be between the processing devices $225_1$-$225_n$ and the line drivers $230_1$-$230_n$. Thus, the location of the controller 222 is not limited to the location shown in FIG. 2.

More specifically, in the downstream direction, the controller 222 receives signal data from the processing devices $225_1$-$225_n$, applies crosstalk filter coefficients to precompensate the signal data against crosstalk, and provides the processing devices $225_1$-$225_n$ with the precompensated signal data.

In the upstream direction, the processing devices $225_1$-$225_n$ receive crosstalk-contaminated signals from the line drivers $230_1$-$230_n$. The controller 222 receives crosstalk-contaminated signals from the processing devices $225_1$-$225_n$, applies crosstalk filter coefficients to post-compensate the received signals for crosstalk, and provides the processing devices $225_1$-$225_n$ with the post-compensated signal data. The processing devices $225_1$-$225_n$ then continue to process the signal data to demodulate the intended upstream information.

Each of the processing devices $225_1$-$225_n$ may communicate with one of the CPEs $250_1$-$250_n$ over the communication lines L1-Ln through an associated line driver (LD) $230_1$-$230_n$. For example, the processing device $225_1$ may provide signals to the LD $230_1$ for the purpose of conveying user data to the CPE $250_1$ over the communication line L1. In addition to the signal provided to the LD $230_1$, the processing device $225_1$ provides an additional signal to the controller 222 that is processed based on the crosstalk filter coefficients, together with similar additional signals from processing devices $225_2$-$225_n$. After precompensation or postcompensation, the controller 222 provides a return signal to processing device $225_1$ that is further processed by processing device $225_1$, in a manner that reduces and/or eliminates the crosstalk emanating from the additional lines L2-Ln.

Each of the CPEs $250_1$-$250_n$ includes a line driver $255_1$-$255_n$ and a processing device $260_1$-$260_n$. Each of the line drivers $255_1$-$255_n$ may be the same or substantially the same as the line drivers (LD) $230_1$-$230_n$.

Discussion of Conventional Art

Figure 3:
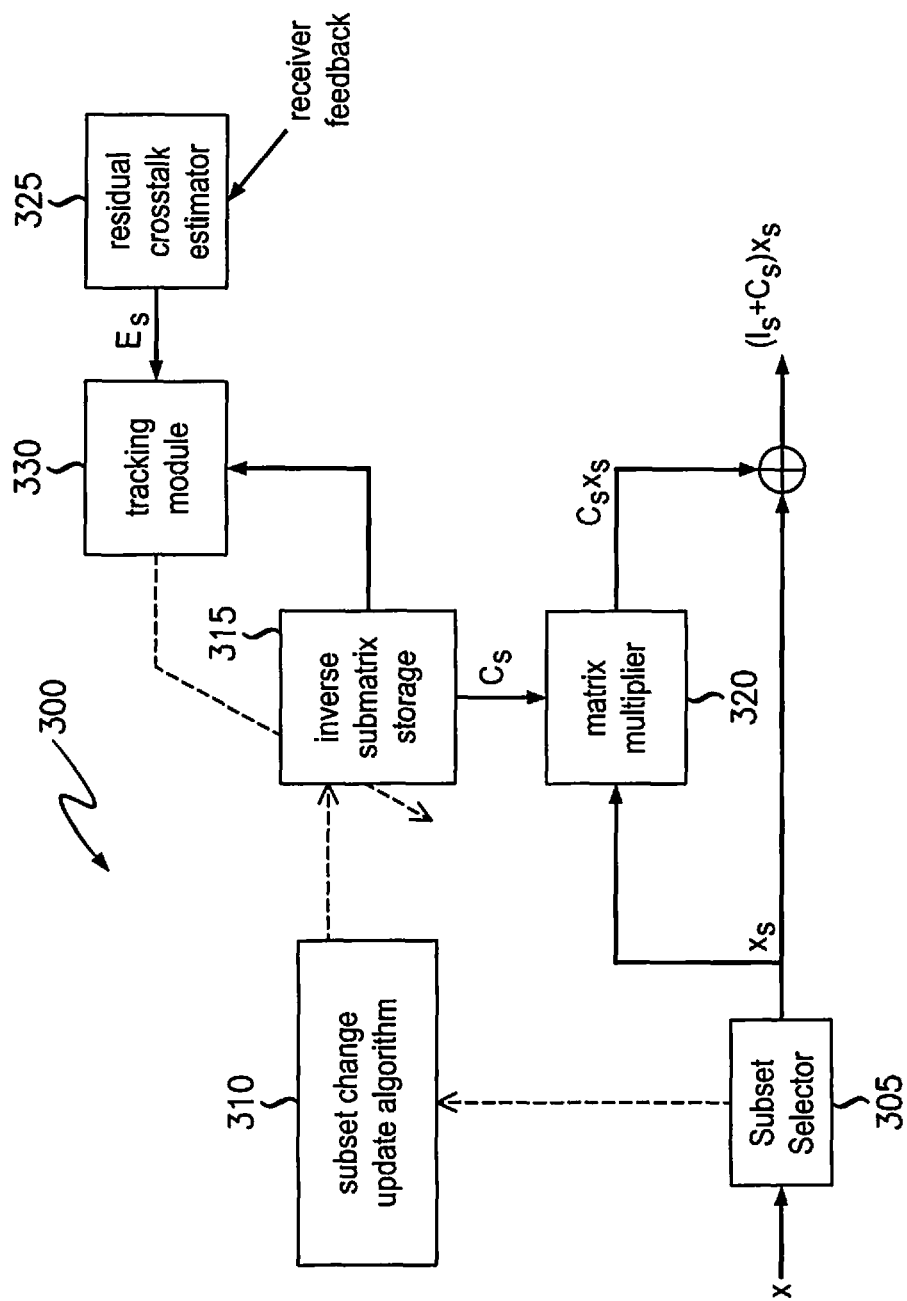

FIG. 3 illustrates a precoding system 300. The precoding system 300 includes a subset selector 305 which receives a signal X. Based on the signal X, the subset selector 305 determines a plurality of signal values $X_s$ (symbols) which correspond to a set of active communication lines S. The plurality of signal values Xs is a vector obtained by taking the symbols from X corresponding to the active lines. While example embodiments will be described as including a subset selector, example embodiments are not limited thereto. For example, only the active lines may provide a data symbol to be transmitted, and the inactive lines may not provide any data symbol. Consequently, instead of selecting a subset of symbols, the precoder just collects the subset. In other words, in some embodiments, the larger vector X is never generated.

When a number of active communication lines changes, the subset selector 305 invokes a subset change update algorithm 310. The subset change update algorithm 310 determines a compensation matrix $C_s$ for only the active lines and stores the compensation matrix $C_s$ in an inverse sub-matrix storage 315. The compensation matrix Cs may be determined using known methods such as those described in U.S. Patent Application Publication No. 2012/0195183, entitled "Multiplicative Updating of Precoder or Postcoder Matrices for Crosstalk Control in a Communication System," the entire contents of which are incorporated herein by reference.

A matrix multiplier 320 multiplies the plurality of signal values $X_s$ with the compensation matrix $C_s$. The product is then added to Xs to obtain the precoded matrix $$(I_s+C_s)X_s$$

where $I_s$ is the identity matrix and $(I_s+C_s)$ is the inverse channel matrix for the subset of active lines.

The compensation matrix $C_s$ is continually or periodically modified based on feedback received by a residual crosstalk estimator 325. The residual crosstalk estimator 325 supplies an estimated residual crosstalk $E_s$ over the active lines to a tracking module 330, which modifies the compensation matrix $C_s$.

The residual crosstalk $E_s$ is the crosstalk left over on the active lines after vectoring has been applied. After determining a precoder matrix, there is generally some small residual crosstalk that can be estimated. Therefore, the precoder matrix is updated to further reduce the residual crosstalk $E_s$.

The term feedback refers to a means by which the transceiver of a communication system such as a CPE communicates to a transceiver of the communication system such as a distribution point values derived from received pilot signals.

The system of FIG. 3 works well when the active set S changes only occasionally, but may be too slow for discontinuous operations with rapidly changing active subsets of communication lines. Moreover, applying this method in parallel by keeping a different inverse compensation matrix saved for each possible subset results in an exponentially large number of subsets being stored.

Figure 4:
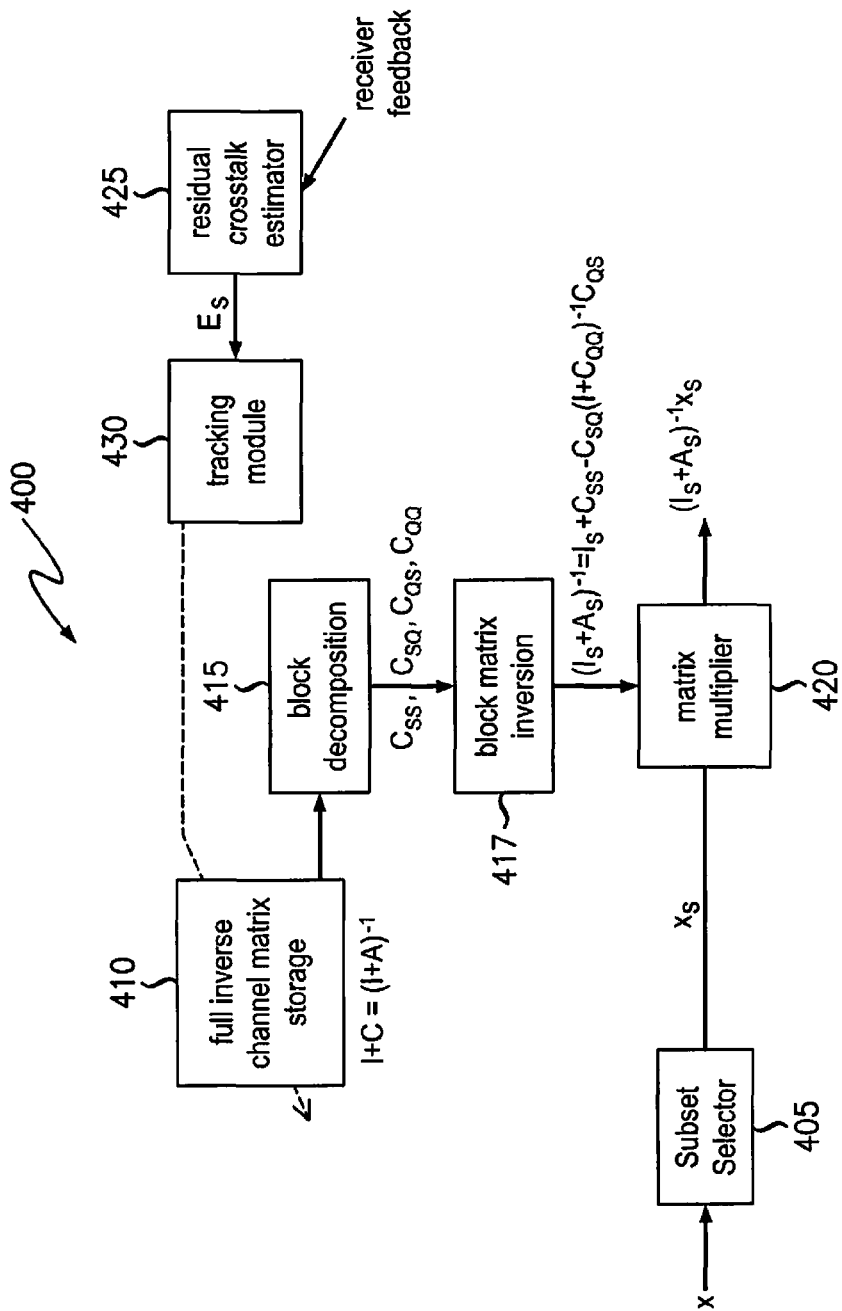

FIG. 4 illustrates a precoding system 400. The precoding system 400 includes a subset selector 405 which receives the signal X. Based on the signal X, the subset selector 405 determines a plurality of signal values $X_s$ which correspond to a set of active communication lines.

The precoding system 400 also includes a full inverse channel matrix storage 410 which stores the full inverse channel matrix I+C, where I is an identity matrix and C represents inverse channel crosstalk coefficients. The full inverse channel matrix I+C may be determined by any known means such as transmitting, during a training phase, a plurality of pilot signals on all communication paths (both active and inactive), using feedback signals from all communication paths to estimate the crosstalk channel, and determining the inverse crosstalk channel matrix based on direct or iterative methods of matrix inversion. A tracking module 430 modifies the full inverse channel matrix I+C based on the estimated residual crosstalk $E_s$ from a residual crosstalk estimator 425.

As shown in FIG. 4, I+A is the channel matrix, A is the crosstalk matrix, $$(I+C)=(I+A)^{-1} \quad (1)$$

is the inverse channel matrix, and $$C=(I+A)^{-1}-I \quad (2)$$

is the inverse compensation matrix. Consequently, the vector X passed into a MIMO channel, results in $$X+AX=(I+A)X, \quad (3)$$

where AX represents the crosstalk term.

A divider 415 decomposes the full inverse compensation matrix C into sub-matrices $C_{SS}$, $C_{SQ}$, $C_{QS}$ and $C_{QQ}$, wherein S represents a subset containing an M number of active lines and Q represents a subset containing a N−M number of inactive lines from an N number of communication lines. Consequently, the sub-matrices $C_{SS}$, $C_{SQ}$, $C_{QS}$ and $C_{QQ}$ cover all combinations of the set of active communication paths and inactive communication paths including active to active communication paths, active to inactive communication paths, inactive to active communication paths, and inactive to inactive communication paths. In particular, $C_{SQ}$ is the sub-matrix of C obtained by taking the rows corresponding to the subset S and the columns corresponding to the subset Q, $C_{QS}$ is the sub-matrix of C obtained by taking the rows corresponding to the subset Q and the columns corresponding to the subset S, $C_{SS}$ is the sub-matrix of C obtained by taking the rows corresponding to the subset S and the columns corresponding to the subset S and $C_{QQ}$ is the sub-matrix of C obtained by taking the rows corresponding to the subset Q and the columns corresponding to the subset Q.

A block matrix inverter 417 computes an inverse matrix for the active communication lines $(I_S+A_S)^{-1}$. For example, the block matrix inverter 417 may first use matrix inversion techniques to compute or approximate $(I_Q+C_{QQ})^{-1}$, where $I_Q$ is the identity matrix for the subset of inactive lines Q, then multiply the result by matrices $C_{SQ}$ and $C_{QS}$ on the left and right, respectively, and then finally add the matrices $I_S$ and $C_{SS}$ to obtain the matrix $(I_S+A_S)^{-1}$.

A matrix multiplier 420 multiplies signal values $X_S$ with the inverse matrix for the active communication lines $(I_S+A_S)^{-1}$ to obtain the precoded signal values $(I_S+A_S)^{-1}X_S$.

In FIG. 4, explicit computation of the inverse matrix for the active communication lines $(I_S+A_S)^{-1}$ involves inverting an N−M square matrix, requiring $O((N-M)^3)$ operations, and then further matrix operations of order $O(M^2+(N-M)MN)$. When for example, M equals N/2, this leads to $O(N^3)$ operations overall, even if one uses an approximate inverse. Consequently, the computation required to compute the inverse matrix for the active communication lines $(I_S+A_S)^{-1}$ is approximately M times the complexity required to precode the data from one symbol $(M^2)$. Therefore, if the number of active lines S changes frequently, hardware used to implement the block matrix decoder 417 may be O(N) times larger or faster than hardware used to implement the matrix multiplier 420.

Figure 5:
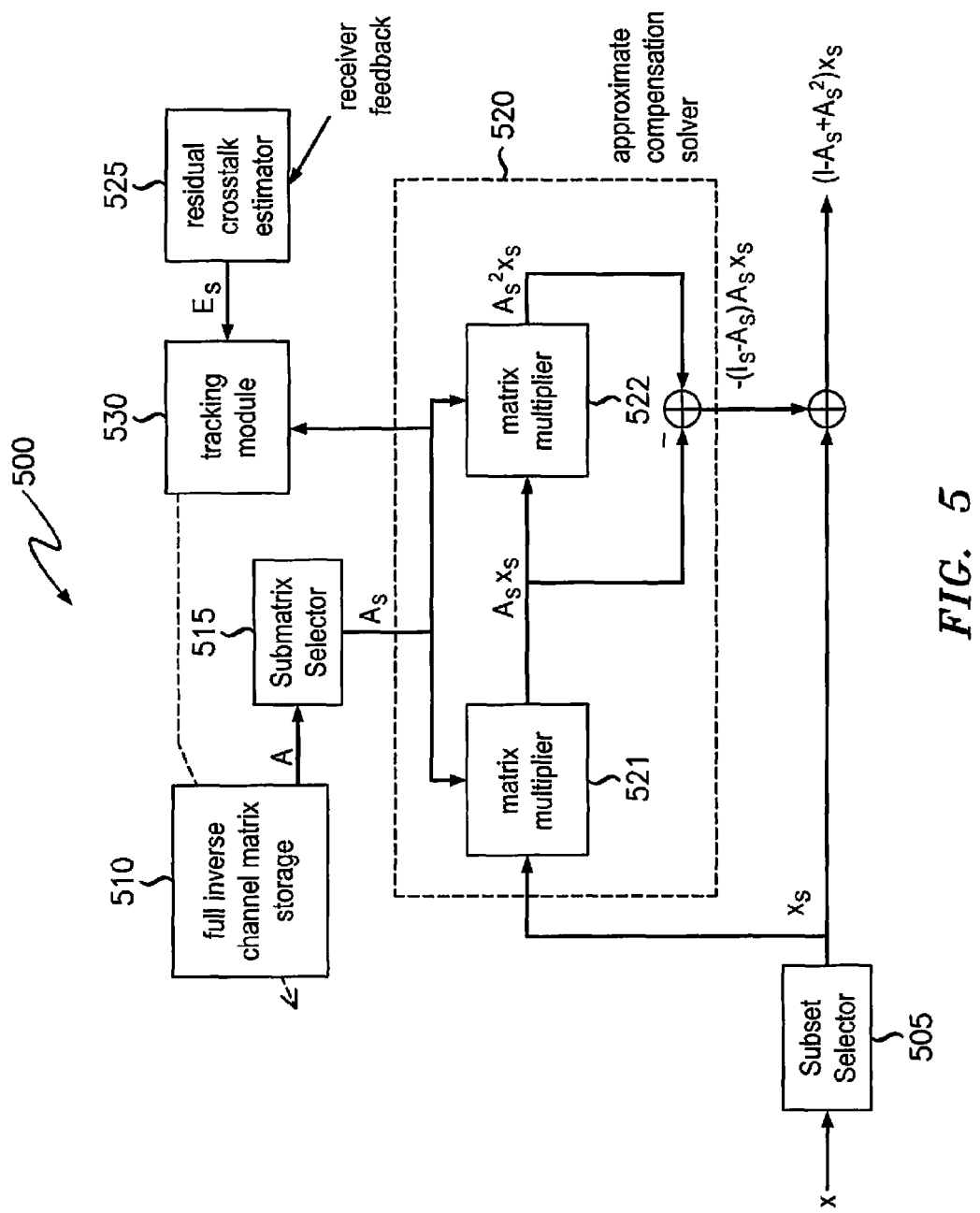

FIG. 5 illustrates a precoding system 500. The precoding system 500 includes a subset selector 505 which receives a signal X. Based on the signal X, the subset selector 505 determines a plurality of signal values $X_s$ which correspond to a set of active communication lines.

The precoding system 500 also includes a full channel matrix storage 510 which stores an estimate of the full channel matrix A. The full channel matrix A may be determined by any known means such as transmitting, during a training phase, a plurality of pilot signals on all communication paths and using feedback signals from all communication paths to estimate the crosstalk channel. A tracking module 530 modifies the full channel matrix A based on the estimated residual crosstalk $E_s$ from a residual crosstalk estimator 525.

A sub-matrix selector 515 selects the sub-matrix $A_S$ that corresponds to the active communication lines S. As the sub-matrix selector 515 knows the full channel matrix A, the sub-matrix selector 515 obtains $A_S$ by taking the elements (channel coefficients) whose row and column indices are both in the subset S. An approximate compensation solver 520 applies the stored matrix subset $A_S$ multiple times to each incoming data vector X to form an approximate solution y to the linear equation $$(I+A_S)y=X \quad (4)$$

The approximate compensation solver 520 includes multipliers 521 and 522. The multiplier 521 multiplies the signal values $X_s$ by the sub-matrix $A_S$. The multiplier 522 multiplies the output of the multiplier 521 with the sub-matrix $A_S$. A difference between the outputs of the multipliers 521 and 522 results in $-(I_S-A_S)A_S X_S$, which is the output of the approximate compensation solver 520. The output of the approximate compensation solver 520 is then added to the signal values $X_S$ to obtain the precoded output of $(I-A_S+A_S^2)X_S$.

From FIG. 5, the overhead required when changing subsets is small. The appropriate sub-matrix is extracted from A, whereas in FIG. 4 a complex inversion operation is used. However, for data vector of symbols $X_S$ to be compensated, two M×M matrix multiplication operations are performed. In addition, the effectiveness of this method decreases (that is, residual crosstalk increases) as the size of the active subset S increases.

Discussion of Precoders According to Example Embodiments

Figure 6A:
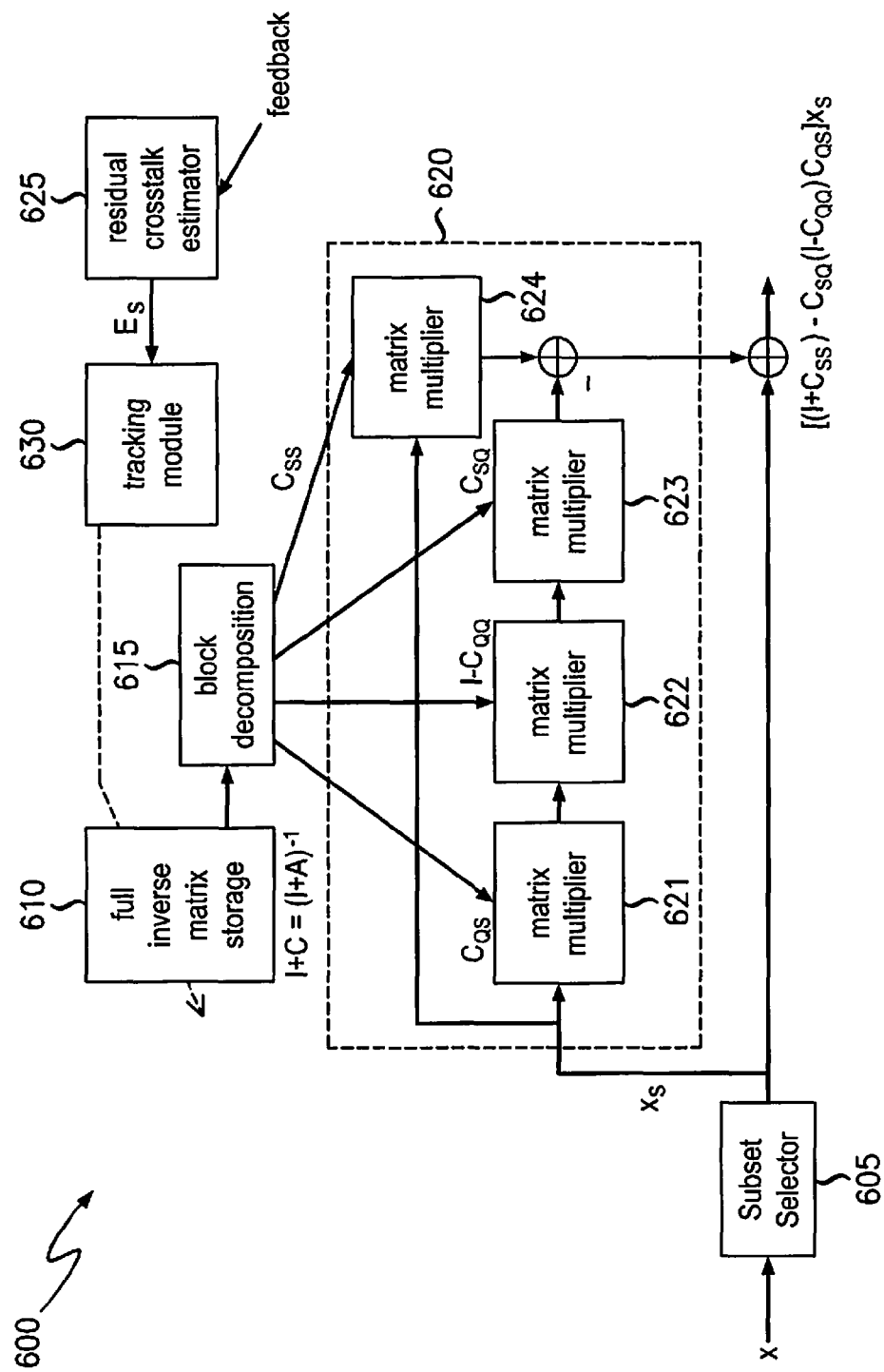
FIG. 6A illustrates a precoding system according to an example embodiment.

FIG. 6A illustrates a precoding system according to an example embodiment. A precoding system 600a may be implemented in the controller 222, for example. The precoding system 600a may be implemented in hardware, software or firmware, for example. If the precoding system 600a is software, a controller such as the controller 222 is specifically programmed to execute the precoding system 600a.

Similar to the precoding system shown in FIG. 4, the precoding system 600a includes a subset selector 605, an inverse channel matrix storage 610, a divider 615, a tracking module 630 and a residual crosstalk estimator 625. The inverse channel matrix storage 610, divider 615, tracking module 630 and residual crosstalk estimator 625 may be referred to as a vectoring control entity (VCE). The VCE in general determines the coefficients to use and a precoder 620 applies them to the data vector of symbols $X_S$.

The inverse channel matrix storage 610 stores the inverse channel matrix I+C that is determined by the controller using conventional means. The inverse channel matrix storage 610 may include one or more memory modules. The memory modules may be separate physical memories (e.g., hard drives), separate partitions on a single physical memory and/or separate storage locations on a single partition of a single physical memory.

The inverse channel matrix I+C corresponds to the full set of N potentially active lines in the system. The inverse channel matrix I+C can be estimated and tracked by the precoding system 600a using feedback based techniques such as those used in G.vector. For example, a system (e.g., system 200) may periodically transmit pilot signals on all N lines and process error feedback signals to estimate a full N×N residual crosstalk matrix, and then make corrections to I+C to reduce the residual crosstalk.

In an example embodiment, the network processor 220 may maintain individual queues containing packets of information to be sent on each of the N lines. At any point in time, some queues may have packets waiting to be sent, while other queues are empty. The set of active lines at a particular time can be chosen by the subset selector 605 to be the set of lines whose queues are not empty.

A divider 615 decomposes the full inverse compensation matrix C into the sub-matrices $C_{SS}$, $C_{SQ}$, $C_{QS}$ and $C_{QQ}$, wherein S represents a subset containing an M number of active lines and Q represents a subset containing a N-M number of inactive lines from an N number of communication lines. This process is the same as described in FIG. 4. Thus, for the sake of brevity, the divider 615 will not be described in further detail.

The precoding system 600a also includes the precoder 620 which receives sub-matrices $C_{SS}$, $C_{QS}$, $C_{QQ}$ and $C_{SQ}$ from the divider 615. The precoder 620 includes matrix multipliers 621, 622, 623 and 624.

The matrix multipliers 621-623 are connected in series. More specifically, the matrix multiplier 621 multiplies the signal values $X_s$ with the sub-matrix $C_{QS}$. The product of the matrix multiplier 621 is then multiplied with I-$C_{QQ}$ at the matrix multiplier 622. The product of the matrix multiplier 622 is then multiplied with the sub-matrix $C_{SQ}$ by the matrix multiplier 623. The matrix multiplier 624 multiplies the signal values $X_s$ with the sub-matrix $C_{SS}$. The precoder 620 then determines a difference between the product of the multiplier 624 and the product of the multiplier 623. The difference is then added by the precoding system 600a to the values $X_S$ to produce precoded values $[(I+C_{SS})-C_{SQ}(I-C_{QQ})C_{QS}]X_S$.

Rather than explicitly computing the inverse matrix inv(I+$A_S$) for the active subset S, the precoding system 600a directly applies various sub-blocks of C to achieve the same effect on a symbol to symbol basis. In particular, given a data symbol X to precode, the precoding system 600a computes $$y = X + C_{SS}X - (C_{SQ}((I-C_{QQ})(C_{QS}X))) \qquad (5)$$

Consequently, the per-symbol computations used are $$(N-M)M + (N-M)^2 + M(N-M) + M^2 = N^2 \qquad (6)$$

That is, the per-symbol precoding complexity is the same as if a discontinuous mode were not used—a basic N×N matrix multiplication. By contrast, the worst-case complexity of the precoder 500 can be twice as large ($2N^2$).

Moreover, the precoding system 600a stores the inverse channel matrix I+C which is easier to track than the direct channel. That is, the matrix I+C can be adapted by feedback-based LMS or block-LMS feedback algorithms to maintain the property $$(I+A)(I+C) = I \qquad (7)$$

Figure 6B:
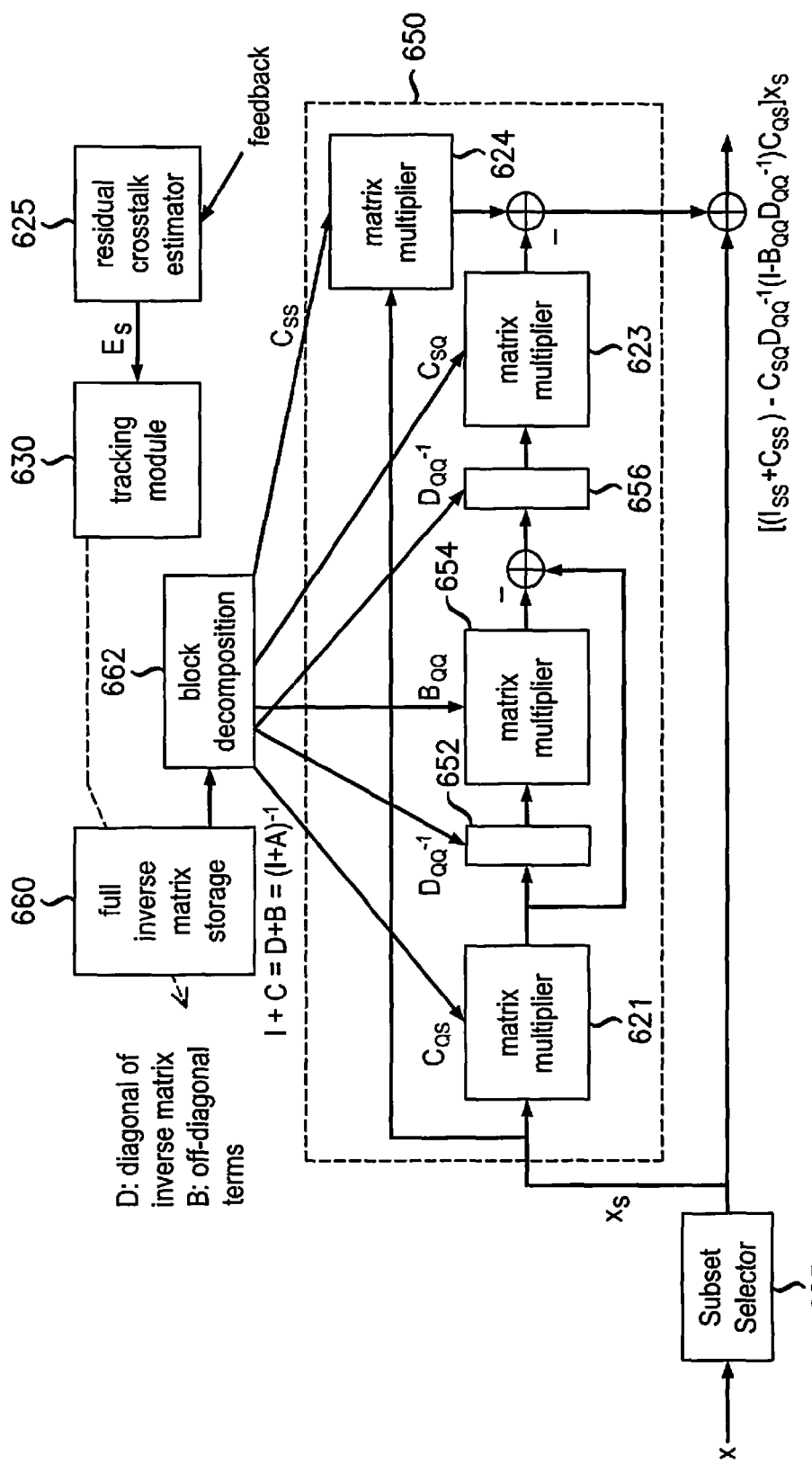
FIG. 6B illustrates a precoding system according to an example embodiment.

FIG. 6B illustrates a precoding system according to another example embodiment. A precoding system 600b may be implemented in the controller 222, for example. The precoding system 600b may be implemented in hardware, software or firmware, for example. If the precoding system 600b is software, controller such as the controller 222 is specifically programmed to execute the precoding system 600b.

The precoding system 600b is substantially similar to the precoding system 600a. Therefore, only the differences between the precoding system 600b and the precoding system 600a will be explained, for the sake of brevity.

As shown, matrices D and B are used where $$I+C = D+B = (I+A)^{-1} \qquad (8)$$

where D is a diagonal of the inverse matrix I+C and B is an off-diagonal matrix (a matrix having zeros on the diagonal).

An inverse matrix storage 660 stores the full channel inverse matrix I+C as D+B. A divider 662 obtains diagonal matrix D and divides it into sub-matrices $D_{SS}$ and $D_{QQ}$, obtains the off-diagonal matrix B and divides it into sub-matrices $B_{SS}$, $B_{SQ}$, $B_{QS}$, and $B_{QQ}$. The divider 662 then further uses the sub-matrices $D_{SS}$, $D_{QQ}$, $B_{SS}$, $B_{SQ}$, $B_{QS}$, and $B_{QQ}$ to generate sub-matrices $D_{QQ}^{-1}$, $$C_{QS} = B_{QS}, \qquad (9)$$

$$C_{SQ} = B_{SQ} \text{ and} \qquad (10)$$

$$C_{SS} = D_{SS} - I_S + B_{SS}. \qquad (11)$$

Computing $D_{QQ}^{-1}$ from $D_{QQ}$ uses (N-M) complex division operations.

The inverse channel matrix storage 660, divider 662, tracking module 630 and residual crosstalk estimator 625 may be referred to as a vectoring control entity (VCE).

Similar to FIG. 6A, the plurality of signal values $X_S$ is multiplied with the sub-matrices $C_{QS}$ and $C_{SS}$ by the multipliers 621 and 624, respectively. A multiplier 652 multiplies the output of the multiplier 621 with the sub-matrix $D_{QQ}^{-1}$. A multiplier 654 multiplies the output of the multiplier 652 with the sub-matrix $B_{QQ}$. A precoder 650 then determines a difference between the outputs of the multiplier 621 and the multiplier 654. A multiplier 656 multiplies the difference between the outputs of the multiplier 621 and the multiplier 654 with the sub-matrix $D_{QQ}^{-1}$. The multiplier 623 multiplies the output of the multiplier 656 with the sub-matrix $C_{SQ}$. The precoder 650 then determines a difference between the outputs of the multiplier 624 and the multiplier 623. The precoding system 600b then adds the difference between the outputs of the multiplier 624 and the multiplier 623 to the plurality of signal values $X_S$ to obtain precoded signal values $[(I_{SS}+C_{SS})-C_{SQ}D_{QQ}^{-1}(I-B_{QQ}D_{QQ}^{-1})C_{QS}]X_S$.

In FIG. 6B, $$I+C_{QQ}=D_{QQ}+B_{QQ} \quad (12)$$

For example, given a matrix

|0.7 0.34|

|−0.4 1.2| the matrix can be decomposed as $I+C_{QQ}$, namely

|1.0 0.0| + |−0.3 0.4|

|0.0 1.0| |−0.4 0.2| or it can be decomposed as $D_{QQ}+B_{QQ}$, namely

|0.7 0.0| + |0.0 0.4|

|0.0 1.2| |−0.4 0.0|

Figure 7:
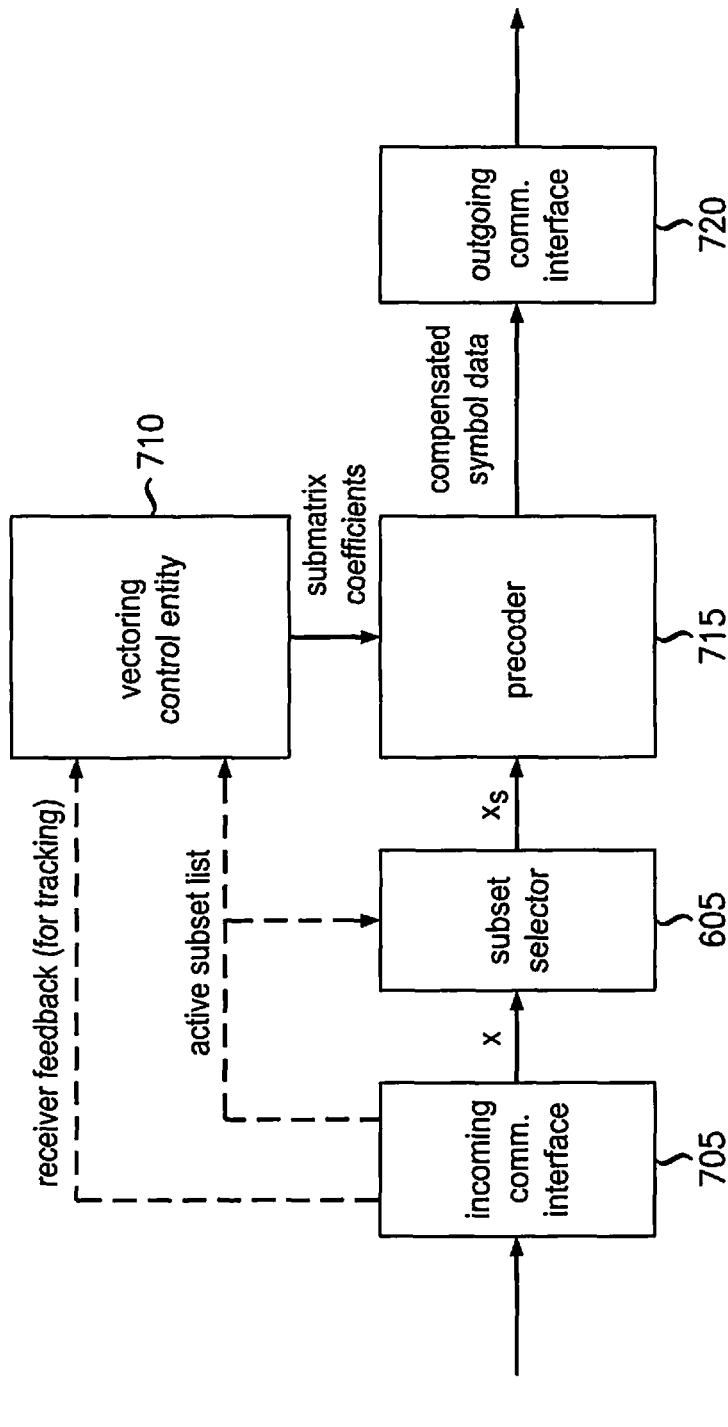

FIG. 7 illustrates the controller 222 including a precoder according to an example embodiment. The controller 222 has a communication interface 705 with each of the processing devices $225_1$-$225_n$. The incoming communication interface 705 receives data and control signals from the processing devices $225_1$-$225_n$. The incoming communication interface 705 forwards symbol data X to the subset selector 605. The incoming communication interface 705 also forwards information about which lines are active to the subset selector 605 and to a vectoring control entity (VCE) 710. The VCE may be the VCE shown in FIG. 6A or 6B.

The subset selector 605 forwards symbol data $X_S$ corresponding to the subset of active lines to a precoder 715. The precoder 715 may be the precoder 620 or the precoder 650. The precoder 715 applies coefficients (e.g., sub-matrices from the divider 615 or the divider 662) received from the VCE 710 to the symbol data received from the subset selector 605 to produce compensated data symbols (precoded data), which are forwarded to an outgoing communication interface 720. The outgoing communication interface 720 sends the compensated data symbols to the processing devices $225_1$-$225_n$. Additionally, the incoming communication interface 705 periodically receives receiver feedback data from the DSPs, which it forwards to the VCE 710. The VCE 710 uses this information to keep the inverse channel matrix in the VCE 710 up to date.

Figure 8:
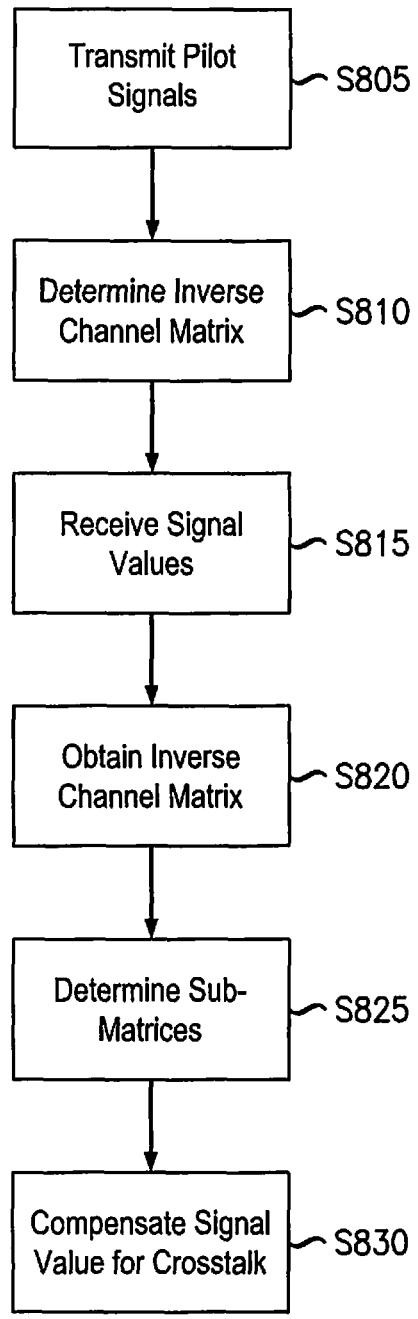

FIG. 8 illustrates a method of reducing crosstalk interference according to an example embodiment. To aid in the description of the method of FIG. 8, FIG. 6A(or B)-7 are used. However, it should be understood that the method of FIG. 8 may be performed by controllers and precoders different that those described in FIG. 6A(or B)-7.

At S805, the controller transmits pilot signals and determines the inverse channel matrix based on the pilot signals at S810. S805 and S810 may be referred to as a training phase because they can be performed while the number of communication lines remains constant. In other words, S805 and S810 do not need to performed when a number of active lines changes. The controller may determine the inverse channel matrix using any known method such as the method described in G.vector.

At S815, the controller receives signal values. The signal values correspond to data to be transmitted over a set of active communication lines respectively.

At S820, the controller obtains the inverse channel matrix that was determined in S810. Based on the set of active communication lines, the controller determines a plurality of sub-matrices from the inverse channel matrix at S825. For example, as described with reference to FIG. 6A, the block decomposition decomposes the inverse channel matrix into sub-matrices $C_{SS}$, $C_{QS}$, $C_{QQ}$ and $C_{SQ}$.

At S825, the controller compensates the signal value for crosstalk by individually applying at least one of the sub-matrices to the plurality of signal values. For example, as described with reference to FIG. 6A, the signal values are multiplied directly with the sub-matrices $C_{QS}$ and $C_{SS}$. The controller is then able to generate the precoded signal values to be transmitted. For example, the precoder 600a generates precoded values $[(I+C_{SS})-C_{SQ}(I-C_{QQ})C_{QS}]X_S$.

Example embodiments require very little up-front computation when the active subset S changes. Moreover, the precoder computes the precoded symbol with complexity $N^2$, regardless of the size of the active subset.

Since the hardware is designed to handle a worst case subset of all users active, the hardware complexity of the precoder according to at least one example embodiment can be half that of the conventional precoders, since the worst case with the precoder according to at least one example embodiment is $N^2$, and the worst case with the precoder of FIG. 5 is $2N^2$.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims. For example, while example embodiments have been described with reference to downstream precompensation applications, example embodiments may be used in upstream postcompensation application.

What is claimed is:

1. A method of reducing crosstalk interference in a system having a plurality of communication paths, the method comprising:
    obtaining a plurality of signal values corresponding to a set of active communication paths, the active communication paths being a subset of the plurality of communication paths;

obtaining an inverse channel matrix, the inverse channel matrix representing an inverse crosstalk channel matrix of the system when the plurality of communication paths in the system are active;

determining a plurality of sub-matrices from the inverse channel matrix based on the set of active communication paths; and compensating the signal values for crosstalk by individually applying at least one of the sub-matrices to the plurality of signal values.

2. The method of claim 1, wherein the compensating includes,
directly applying first and second sub-matrices to the plurality of signal values.

3. The method of claim 2, wherein the compensating includes,
multiplying the first sub-matrix with the plurality of signal values, and
multiplying the second sub-matrix with the plurality of signal values.

4. The method of claim 3, wherein the compensating includes,
directly compensating the plurality of signal values based on a difference between a product of multiplying the second sub-matrix with the plurality of signal values and a first value, the first value being based on a product of multiplying the first sub-matrix with the plurality of signal values.

5. The method of claim 1, wherein the sub-matrices correspond to all combinations of the set of active communication paths and inactive communication paths including active to active communication paths, active to inactive communication paths, inactive to active communication paths, and inactive to inactive communication paths.

6. The method of claim 1, wherein the compensating compensates the signal values as $$[(I+C_{SS})-C_{SQ}(I-C_{QQ})C_{QS}]X_S$$

wherein $C_{SS}$, $C_{SQ}$, $C_{QQ}$ and $C_{QS}$ are sub-matrices from the inverse channel matrix, I is an identity matrix and $X_S$ is the plurality of signal values.

7. The method of claim 1, wherein the compensating compensates the signal values as $$[(I+C_{SS})-C_{SQ}D_{QQ}^{-1}(I-B_{QQ}D_{QQ}^{-1})C_{QS}]X_S$$

wherein $C_{SS}$, $C_{SQ}$, $C_{QQ}$, and $C_{QS}$ are sub-matrices from the inverse channel matrix, $D_{QQ}$ is the diagonal component of $C_{QQ}$, $B_{QQ}$ is the off-diagonal component of $C_{QQ}$, I is an identity matrix and Xs is the plurality of signal values.

8. The method of claim 1, further comprising:
transmitting, during a training phase, a plurality of pilot signals on all communication paths; and
determining the inverse channel matrix based on the transmitting.

9. The method of claim 8, further comprising:
activating, during a data transmission phase, only the active communication paths.

10. A system having a plurality of communication paths, the system comprising:
a controller configured to,
obtain a plurality of signal values corresponding to a set of active communication paths, the active communication paths being a subset of the plurality of communication paths,
obtain an inverse channel matrix, the inverse channel matrix representing an inverse crosstalk channel matrix of the system when the plurality of communication paths in the system are active,
determine a plurality of sub-matrices from the inverse channel matrix based on the set of active communication paths, and
compensate the signal values for crosstalk by individually applying at least one of the sub-matrices to the plurality of signal values.

11. The system of claim 10, wherein the controller is further configured to directly apply first and second sub-matrices to the plurality of signal values.

12. The system of claim 11, wherein the controller is further configured to multiply the first sub-matrix with the plurality of signal values, and multiply the second sub-matrix with the plurality of signal values.

13. The system of claim 12, wherein the controller is further configured to directly compensate the plurality of signal values based on a difference between a product of multiplying the second sub-matrix with the plurality of signal values and a first value, the first value being based on a product of multiplying the first sub-matrix with the plurality of signal values.

14. The system of claim 10, wherein the sub-matrices correspond to all combinations of the set of active communication paths and inactive communication paths.

15. The system of claim 10, wherein the controller is further configured to compensate the signal values as $$[(I+C_{SS})-C_{SQ}(I-C_{QQ})C_{QS}]X_S$$

wherein $C_{SS}$, $C_{SQ}$, $C_{QQ}$ and $C_{QS}$ are sub-matrices, I is an identity matrix and $X_S$ is the plurality of signal values.

16. The system of claim 10, wherein the controller is further configured to compensate the signal values as $$[(I+C_{SS})-C_{SQ}D_{QQ}^{-1}(I-B_{QQ}D_{QQ}^{-1})C_{QS}]X_S$$

wherein $C_{SS}$, $C_{SQ}$, $C_{QQ}$, and $C_{QS}$ are sub-matrices from the inverse channel matrix, $D_{QQ}$ is the diagonal component of $C_{QQ}$, $B_{QQ}$ is the off-diagonal component of $C_{QQ}$, I is an identity matrix and Xs is the plurality of signal values.

17. The system of claim 10, wherein the controller is further configured to transmit during a training phase, a plurality of pilot signals on all communication paths and determine the inverse crosstalk channel matrix based on the transmitting.

18. The system of claim 17, wherein the controller is further configured to activate during a data transmission phase, only the active communication paths.

19. A method of reducing crosstalk interference in a system having a plurality of communication paths, the method comprising:
obtaining, by a system element, a plurality of signal values corresponding to a set of active communication paths, the active communication paths being a subset of the plurality of communication paths;
obtaining, by the system element, an inverse channel matrix, the inverse channel matrix representing an inverse crosstalk channel matrix of the system when the plurality of communication paths in the system are active;
determining, by the system element, a plurality of sub-matrices from the inverse channel matrix based on the set of active communication paths; and
compensating, by the system element, the signal values for crosstalk by individually applying at least one of the sub-matrices to the plurality of signal values.

* * * * *